(12) United States Patent
Saysell

(10) Patent No.: US 10,571,011 B2
(45) Date of Patent: Feb. 25, 2020

(54) GEARBOX ASSEMBLY AND METHOD FOR MAINTAINING AN GEARBOX ASSEMBLY

(71) Applicant: ROMAX TECHNOLOGY LIMITED, Nottingham, Nottinghamshire (GB)

(72) Inventor: David Saysell, Nottingham (GB)

(73) Assignee: ROMAX TECHNOLOGY LIMITED, Nottingham (GB)

( * ) Notice: Subject to any disclaimer, the term of this patent is extended or adjusted under 35 U.S.C. 154(b) by 88 days.

(21) Appl. No.: 15/746,825

(22) PCT Filed: Aug. 10, 2016

(86) PCT No.: PCT/IB2016/054813
§ 371 (c)(1),
(2) Date: Jan. 23, 2018

(87) PCT Pub. No.: WO2017/025907
PCT Pub. Date: Feb. 16, 2017

(65) Prior Publication Data
US 2019/0113126 A1    Apr. 18, 2019

(30) Foreign Application Priority Data
Aug. 12, 2015 (GB) .................................. 1514308.4

(51) Int. Cl.
*F16H 57/04* (2010.01)
*F16H 57/02* (2012.01)
(Continued)

(52) U.S. Cl.
CPC ........... *F16H 57/031* (2013.01); *F03D 15/00* (2016.05); *F16H 1/46* (2013.01); *F16H 37/041* (2013.01);
(Continued)

(58) Field of Classification Search
CPC . F05B 2260/40311; F16H 2057/02078; F16H 57/045
See application file for complete search history.

(56) References Cited

U.S. PATENT DOCUMENTS

| | | | | |
|---|---|---|---|---|
| 4,573,373 | A | * | 3/1986 | Shimizu .................... F16H 3/54 184/6.12 |
| 2003/0108426 | A1 | * | 6/2003 | Eccles .................. B64D 41/007 416/170 R |

(Continued)

FOREIGN PATENT DOCUMENTS

| CN | 201714590 U | 1/2011 |
|---|---|---|
| CN | 202579058 U | 12/2012 |

(Continued)

*Primary Examiner* — Tisha D Lewis

(57) ABSTRACT

This assembly (400) has a housing (402) for high speed components and a collar (404) located at the output end of the housing and extending radially inward from an outer surface of the housing (402), where the collar retains lubricant (406) in the gearbox when the gearbox is stationary. The collar includes a gap (502), such that one or more of the high speed components can pass through the gap in the collar and such that components offset from the central axis of the gearbox are not impeded by the collar. The high speed components include a high speed shaft (408) and a mechanical pump (410), both of which are offset from the central axis of the gearbox. The housing comprises a cover (410) having one or more holes (510) such that one or more of the high speed components can pass through the gap in the collar.

16 Claims, 8 Drawing Sheets

(51) Int. Cl.
*F16H 57/031* (2012.01)
*F16H 37/04* (2006.01)
*F03D 15/00* (2016.01)
*F16H 1/46* (2006.01)
*F16H 57/021* (2012.01)

(52) U.S. Cl.
CPC ....... *F16H 57/021* (2013.01); *F16H 57/0486* (2013.01); *F05B 2260/40311* (2013.01); *F16H 2057/02078* (2013.01)

(56) References Cited

U.S. PATENT DOCUMENTS

| | | | |
|---|---|---|---|
| 2007/0049450 A1* | 3/2007 | Miller | F16H 15/50 |
| | | | 475/208 |
| 2007/0148425 A1 | 6/2007 | Cheng et al. | |
| 2013/0130858 A1* | 5/2013 | Degeling | F16H 37/041 |
| | | | 475/159 |
| 2014/0161591 A1* | 6/2014 | Venter | F01D 25/20 |
| | | | 415/122.1 |

FOREIGN PATENT DOCUMENTS

| | | |
|---|---|---|
| DE | 102011007800 A | 10/2012 |
| DE | 102011006665 A1 | 6/2013 |
| DE | 102012202452 A | 8/2013 |

* cited by examiner

REAR VIEW

GEARBOX ASSEMBLY AND METHOD FOR MAINTAINING AN GEARBOX ASSEMBLY

TECHNICAL FIELD

The present invention relates to planetary gearboxes having a high speed output. In particular it relates to an assembly for the high speed components of a planetary gearbox having a cover facilitating access to these components for maintenance. The components include a high speed shaft and a high speed intermediate shaft assembly.

BACKGROUND ART

Wind turbine drivetrains commonly consist of an aerodynamic rotor, which is supported on a rotor shaft, itself supported on one or more bearings, which support the shaft relative to the turbine structure while permitting rotation around the rotor axis. The rotor shaft is connected to a speed increasing gearbox, commonly comprising a number of planetary and/or parallel gear stages. The output of this gearbox is then connected by a further shaft to a generator which produces the electrical output.

FIG. 1 is a perspective view of a non-limiting example of a wind turbine. Although an offshore wind turbine is shown, it should be noted that the description below may be applicable to other types of wind turbines. The wind turbine 102 includes rotor blades 104 mounted to a hub 100, which is supported by a nacelle 108 on a tower 114. Wind causes the rotor blades 104 and hub 106 to rotate about a main axis. This rotational energy is delivered to a power transmission system housed within the nacelle 108.

FIG. 2 illustrates a non-limiting example a schematic cross sectional diagram of a prior art wind turbine gear box 18. The gear box 18 includes a first stage, a second stage and a third stage. The first stage of the gear box 18 includes an input shaft 24 (comprising a planet carrier 26), a ring gear 28, a plurality of planet gears 30, a sun gear 32 and a bearing arrangement 34. The second stage of the gear box 18 includes a ring gear 36, a plurality of planet gears 38, a sun gear 40 and a planet carrier 42 including a non-rotating support component torsionally connected to a fixed or ground point on the wind turbine, such as nacelle 108. The third, or final, stage of the gear box 18 includes a first output gear 44, also known as the high speed wheel, a second output gear 48 and an output shaft 50, also known as the high speed shaft. The third stage first output gear 44 is connected to the first stage sun gear 32 and is driven by the first stage sun gear 32.

The power transmission system housed within nacelle 108 of the wind turbine 102 includes a main rotor shaft (also known and referred to as a low-speed shaft) which is connected to the hub 100 via a main bearing. The input shaft 24 is connected to hub 100 and is arranged to rotate about the longitudinal axis 60. One end of gearbox 18 is connected to the low speed shaft and output shaft 50 is, or is connected to the high-speed shaft. The high speed intermediate assembly includes sun gear 30 and output gear 44. The output shaft 50 provides an input to the generator.

WO2011/0757737 discloses an arrangement for replacing or maintaining a high speed shaft in the tower/nacelle in which a detachable module includes second output gear 48 and output shaft 50.

Maintenance or replacement of the high speed wheel (output gear 44) on tower poses a number of problems as it requires removal of the high speed intermediate assembly. FIG. 3 shows a prior art design having a rear cover 310 of similar diameter to the gear box housing, which makes it difficult to be detached from the gearbox housing. It also means that the lubricant has to be drained from the gearbox before the rear cover is removed.

One approach has been to have a top cover on the gearbox, which can be removed without draining the lubricant from the gearbox. However, the high speed shaft and the high speed intermediate shaft have to be removed before the high speed intermediate gear can be hoisted out.

DISCLOSURE OF INVENTION

The present invention provides a solution to these problems by removing the need to drain all the lubricant from the gear box and allowing the high speed intermediate shaft assembly to be accessed or removed from the gearbox.

According to a one aspect of the present invention, an assembly for a horizontally mounted planetary gearbox comprises high speed components of the gearbox; a housing for the high speed components; and a collar located at the output end of the housing and extending radially inward from an outer surface of the housing. This arrangement means that the collar retains lubricant in the gearbox when the gearbox is stationary.

Preferably, the collar includes a gap, which means that one or more of the high speed components pass through the gap in the collar. It also means that components offset from the central axis of the gearbox are not impeded by the collar. Preferably, the high speed components include a high speed shaft and a mechanical pump, both of which are offset from the central axis of the gearbox.

Preferably, the housing comprises a cover comprising one or more holes. This means that one or more of the high speed components can pass through the holes in the collar. The high speed components include a high speed shaft, a mechanical pump, and a high speed intermediate shaft. The first two of these are offset with respect to the central axis of the gearbox, and the third is coaxial. Preferably, the cover comprises means for reversible connection to the collar. This means that the cover has a diameter which is smaller than the diameter of the housing, which facilitates its removal from the housing.

Preferably, the assembly also comprises a bearing housing, the bearing housing including engagement means for one or more guide bars, and a high speed intermediate shaft assembly comprising a gear, the gear including one or more holes through which one or more guide bars can pass for engagement with the bearing housing. This means that the high speed intermediate shaft assembly can be moved along the guide bars and out of the housing. Preferably, the high speed intermediate shaft assembly can be supported by an external hoist prior to disengagement of the guide bars.

According to another aspect, the present invention includes a method for maintaining an assembly for a horizontally mounted planetary gearbox of the type disclosed above, the method comprising the steps of:
(a) removing the high speed shaft assembly;
(b) checking a level of lubricant within the gearbox and if the level of lubricant is above a height of the collar draining sufficient lubricant by means of a mechanical pump so that the level of lubricant is below a height of the collar;
(c) removing the mechanical pump;
(d) engaging the guide bars with the bearing housing;
(e) moving the high speed intermediate shaft assembly along the guide bars and out of the housing;

(d) supporting the high speed intermediate shaft assembly by the external hoist;
(g) disengaging the guide bars; and
(h) lowering the assembly onto a support platform for servicing.

BRIEF DESCRIPTION OF DRAWINGS

The invention will now be described with reference to FIGS. 1-4.

BEST MODE FOR CARRYING OUT THE INVENTION

Figure 1:
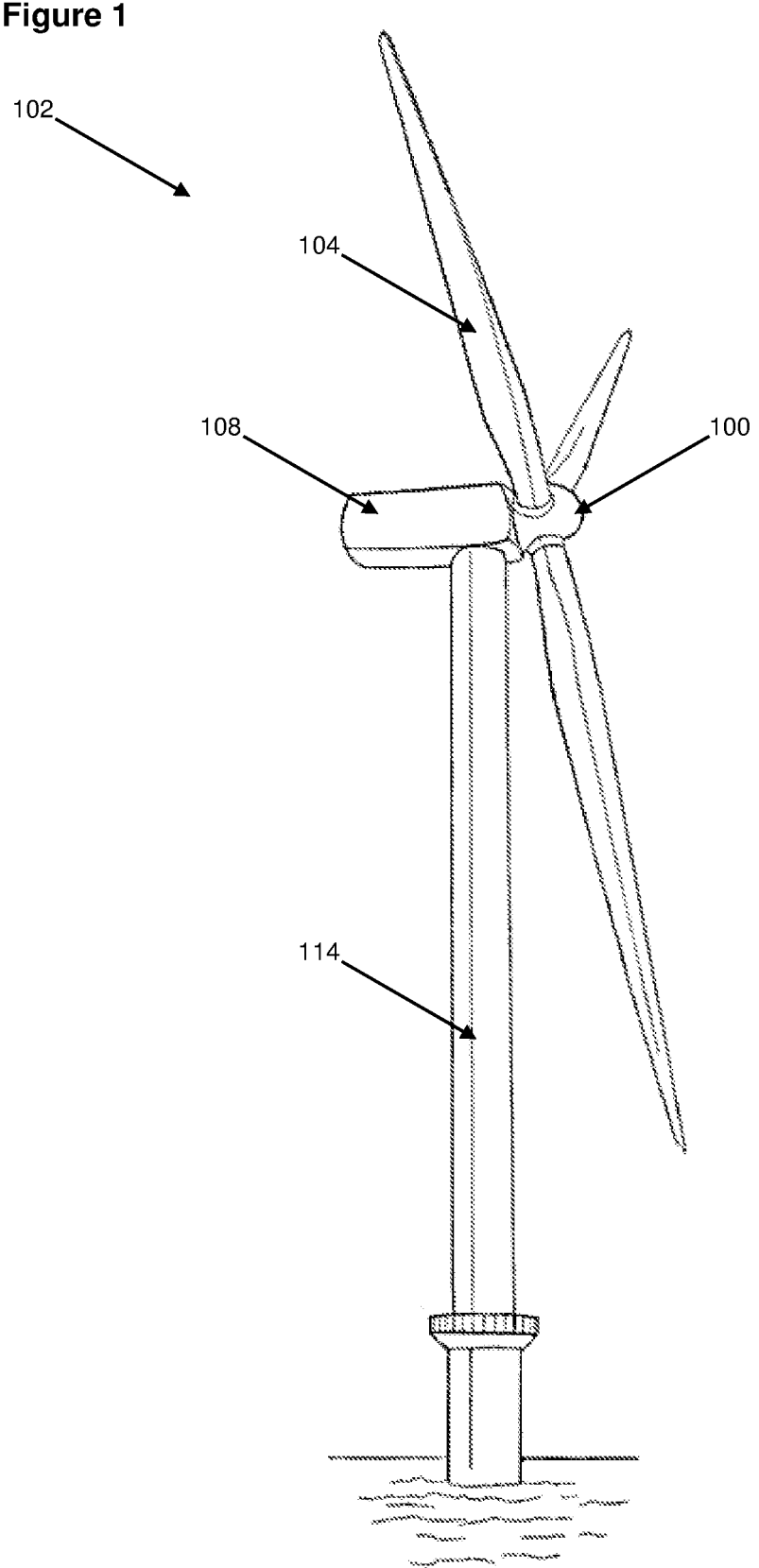
FIG. 1 shows an external view of an offshore wind turbine.
Figure 2:
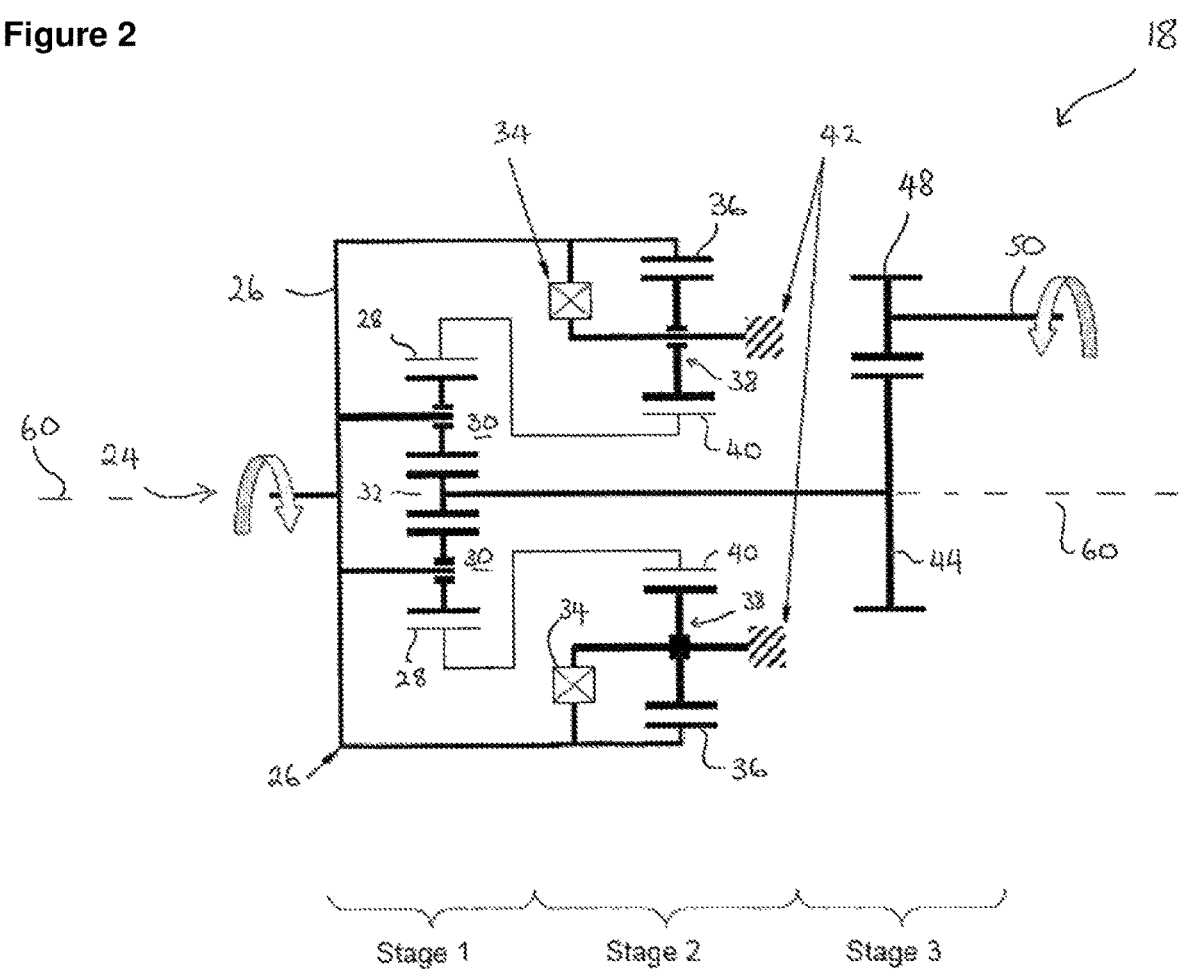
FIG. 2 shows a schematic diagram of a wind turbine gear box.
Figure 3:
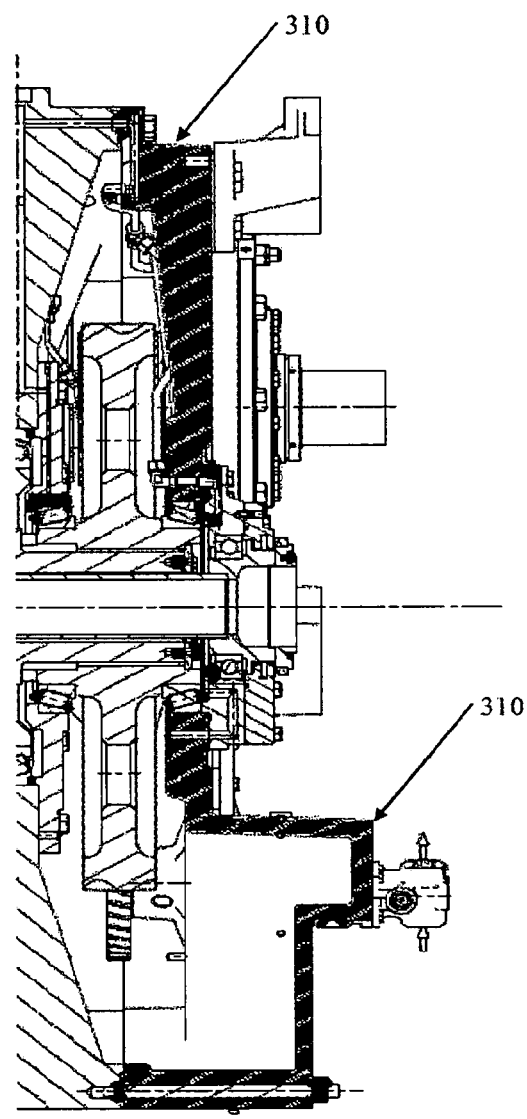
FIG. 3 shows a prior art cover for a gearbox.
Figure 4:
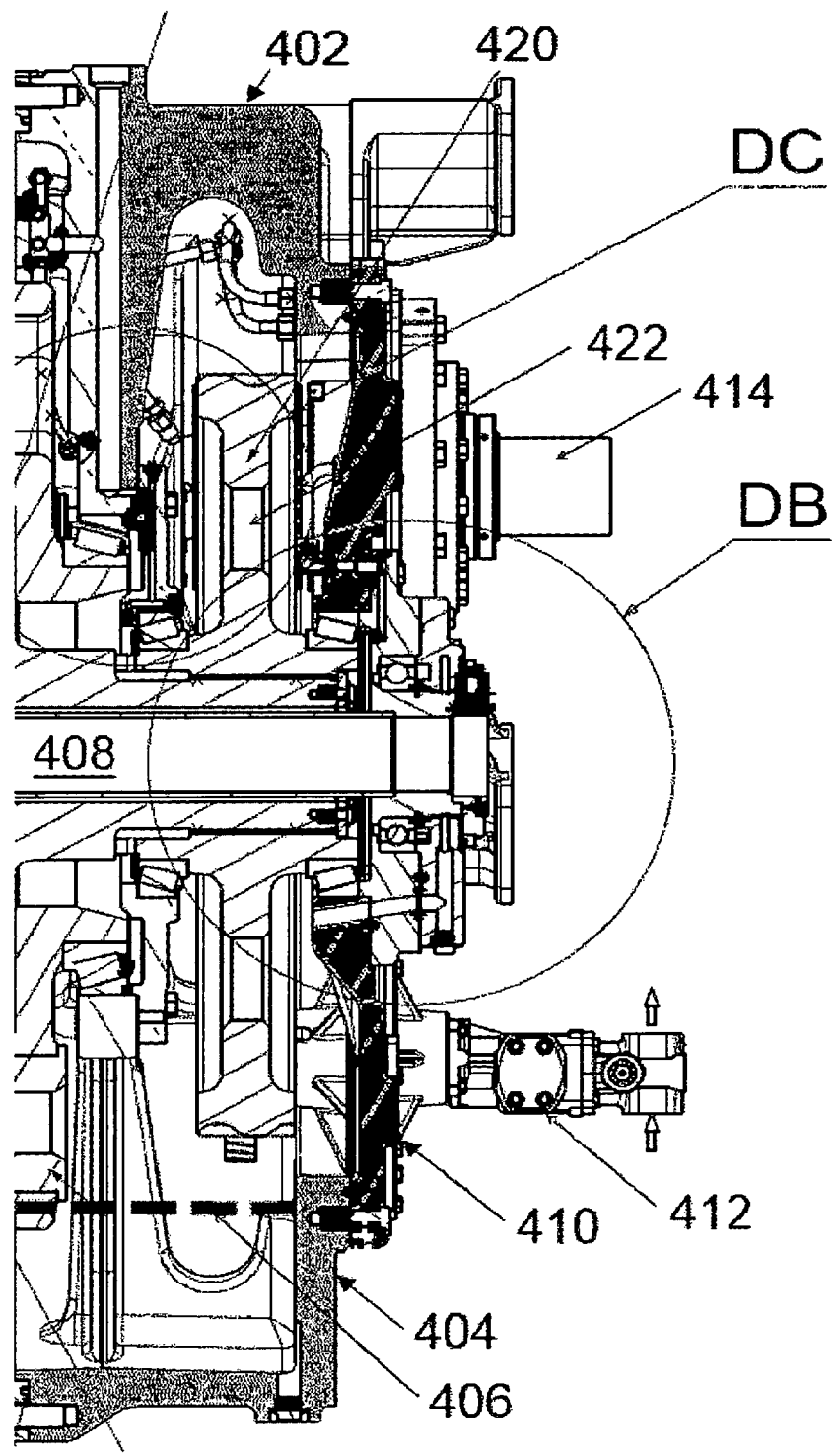
FIG. 4 shows a schematic of an assembly of the present invention.
Figure 5:
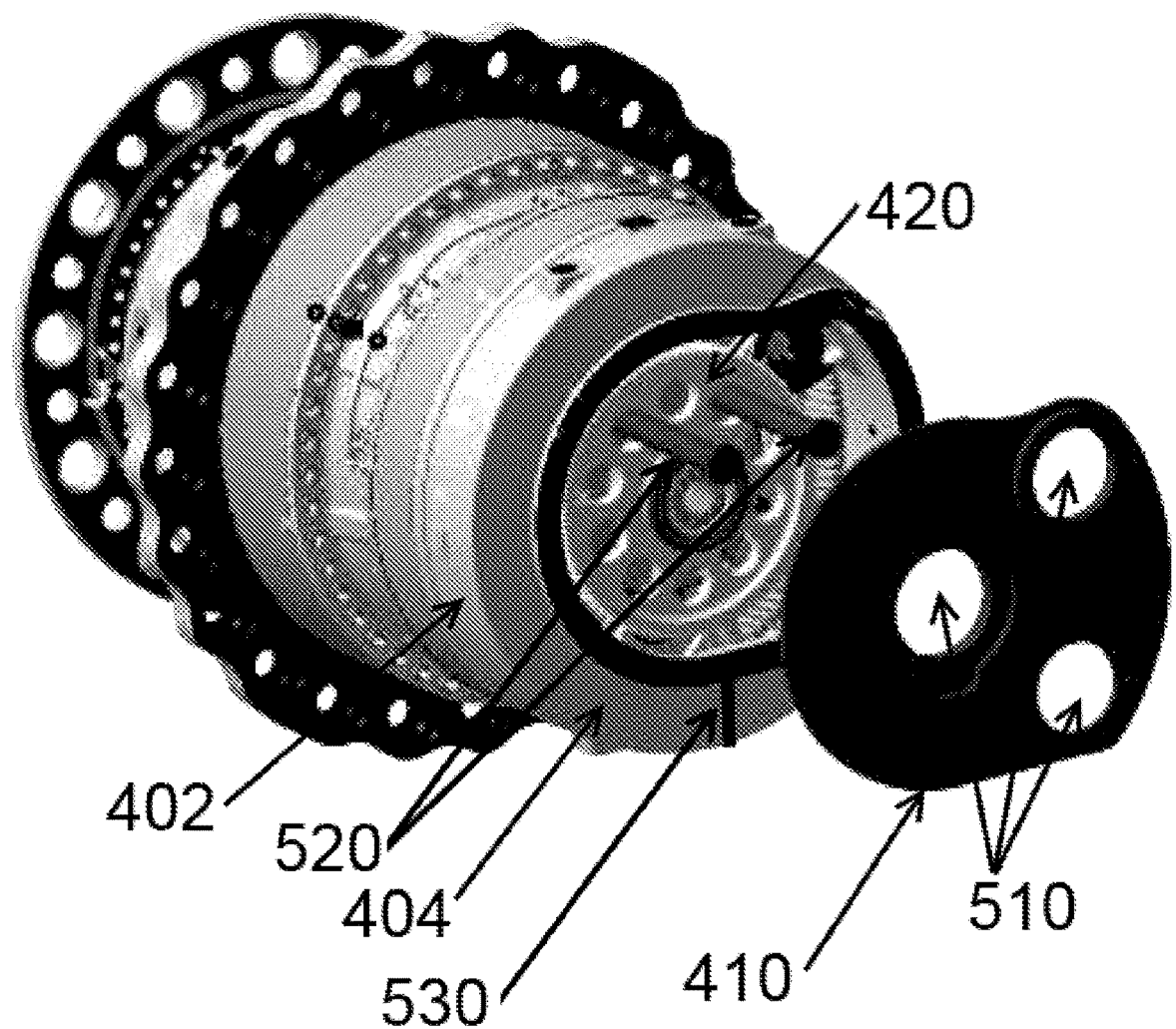
FIG. 5 shows a schematic of a method for maintaining a high speed intermediate assembly.

Referring now to FIGS. 4 and 5, an assembly 400 for a horizontally mounted planetary gearbox comprises high speed components of the gearbox; a housing 402 for the high speed components; and a collar 404 located at the output end of the housing and extending radially inward from an outer surface of the housing 402. This arrangement means that the collar retains lubricant 406 in the gearbox when the gearbox is stationary.

The collar includes a gap 502, which means that one or more of the high speed components pass through the gap in the collar. It also means that components offset from the central axis of the gearbox are not impeded by the collar. The high speed components include a high speed shaft 408 and a mechanical pump 410, both of which are offset from the central axis of the gearbox.

The housing comprises a cover 410 comprising one or more holes 510. This means that one or more of the high speed components can pass through the holes in the collar. The high speed components include a high speed shaft 414, a mechanical pump 412, and a high speed intermediate shaft 408. The first two of these are offset with respect to the central axis of the gearbox, and the third is coaxial. The cover comprises means for reversible connection to the collar. This means that the cover has a diameter which is smaller than the diameter of the housing, which facilitates its removal from the housing.

Figure 6:
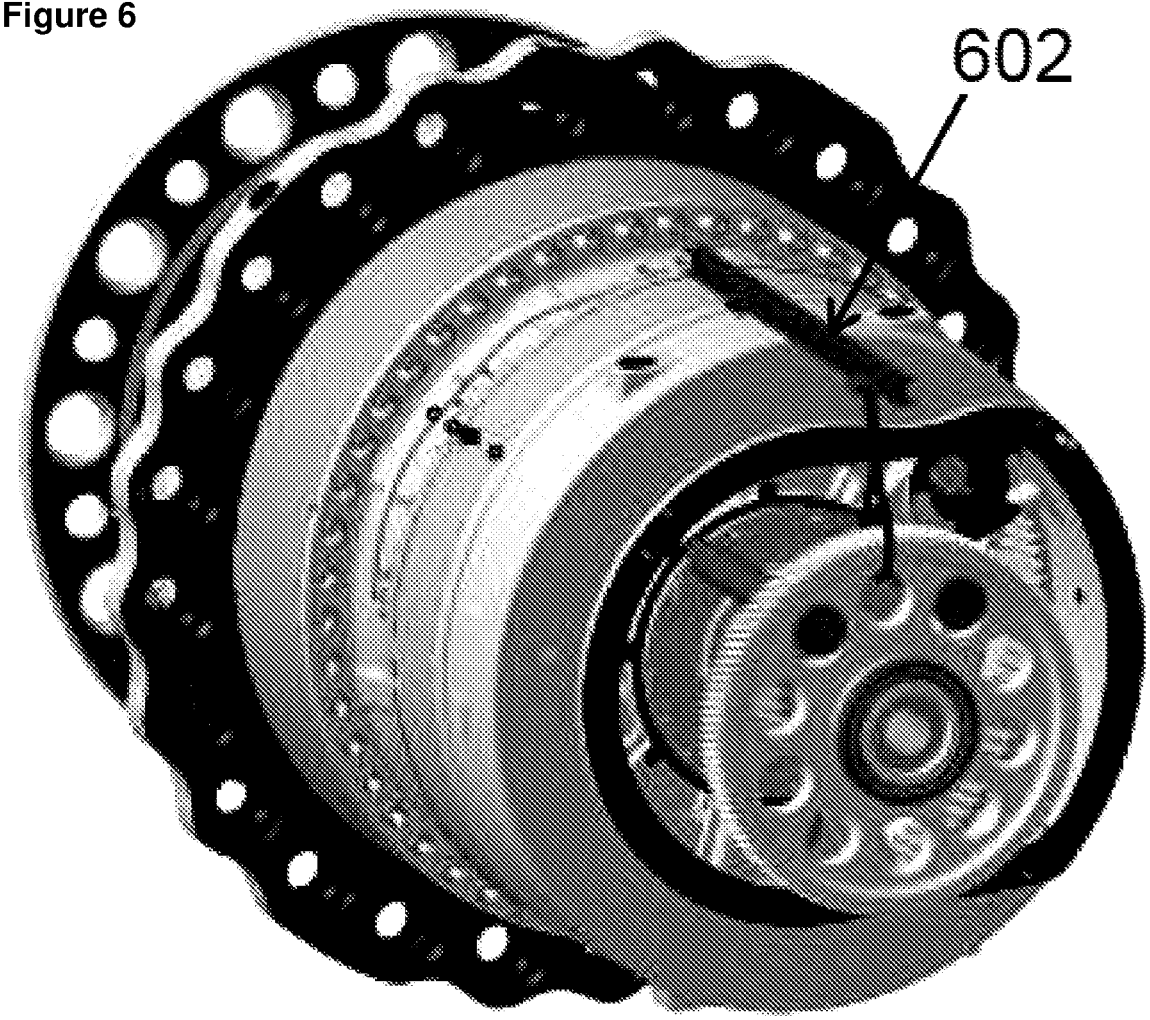
FIG. 6 shows a view of an assembly of the present invention.
Figure 7:
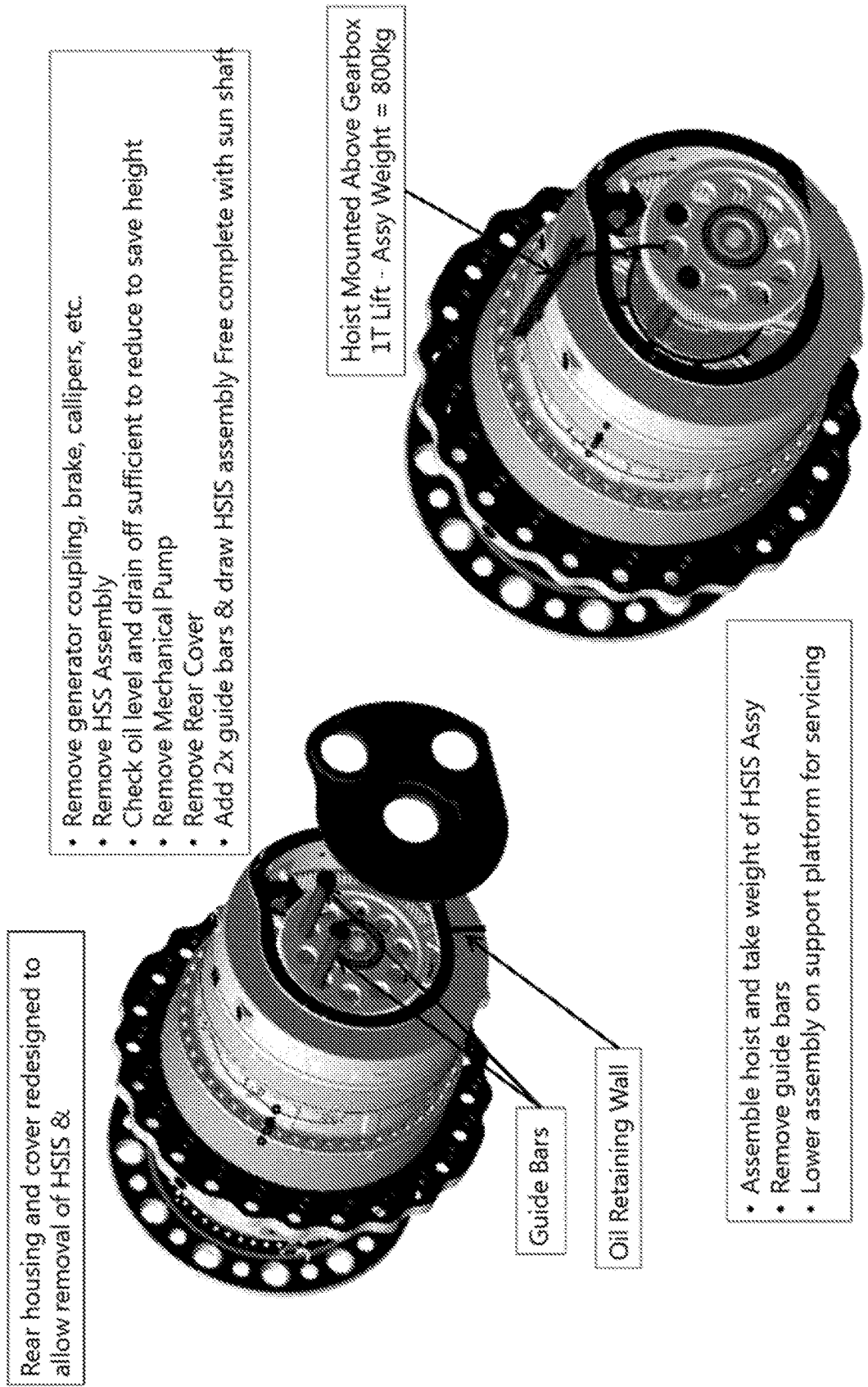
FIG. 7 shows a schematic view illustrating a method for maintaining an assembly of the present invention.
Figure 8:
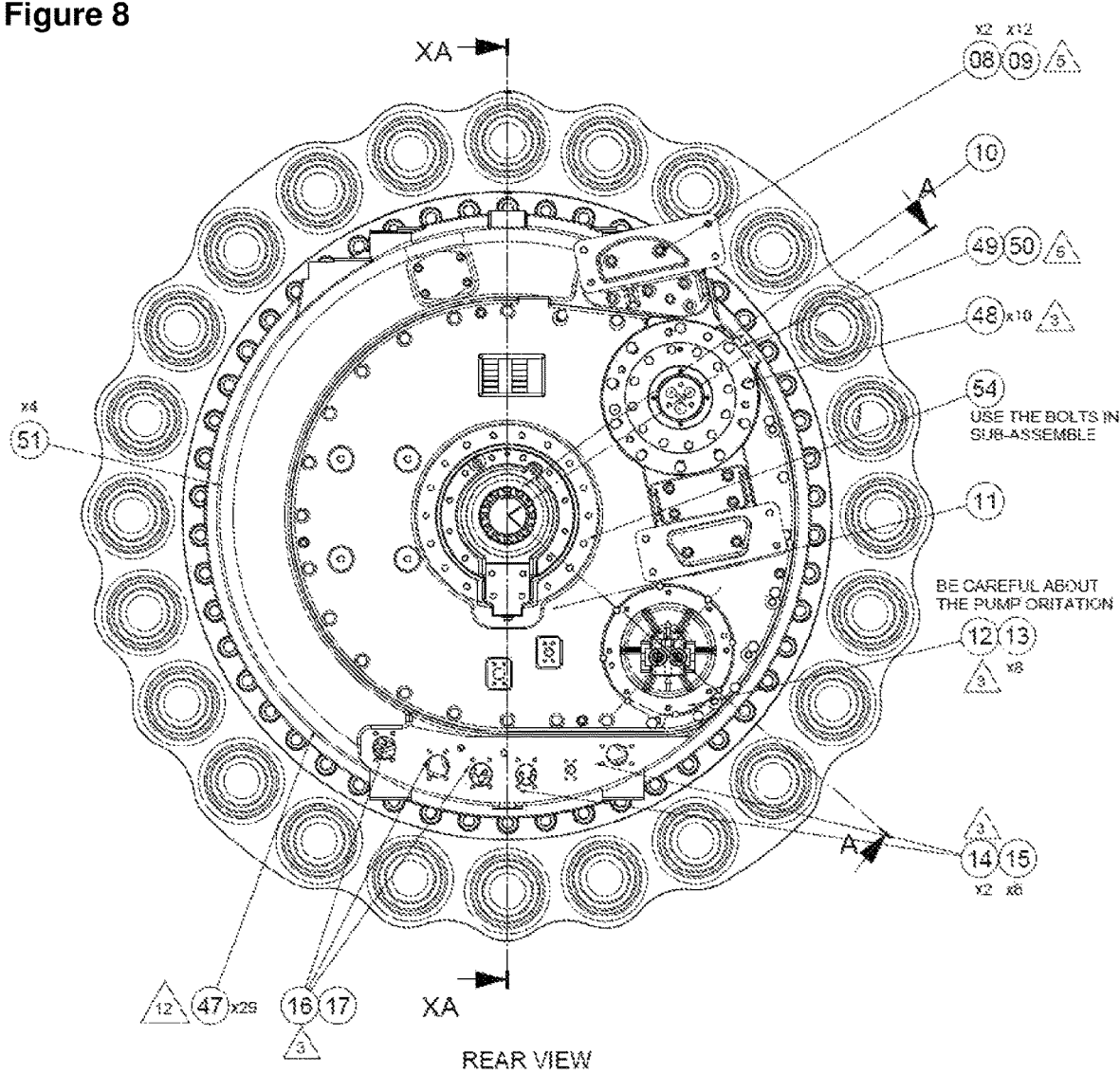
FIG. 8 shows a view of an assembly of the present invention.

The assembly also includes engagement means for one or more guide bars, and a high speed intermediate shaft assembly comprising a gear 420, the gear including one or more holes 422 through which one or more guide bars 520 can pass for engagement. Referring to FIG. 6, this means that the high speed intermediate shaft assembly can be moved along the guide bars and out of the housing. Preferably, the high speed intermediate shaft assembly can be supported by an external hoist prior 602 to disengagement of the guide bars.

According to another aspect, the present invention includes a method for maintaining an assembly for a horizontally mounted planetary gearbox of the type disclosed above, the method comprising the steps of:
(a) removing the high speed shaft assembly;
(b) checking a level of lubricant within the gearbox and if the level of lubricant is above a height of the collar draining sufficient lubricant by means of a mechanical pump so that the level of lubricant is below a height of the collar;
(c) removing the mechanical pump;
(d) engaging the guide bars with the bearing housing;
(e) moving the high speed intermediate shaft assembly along the guide bars and out of the housing;
(d) supporting the high speed intermediate shaft assembly by the external hoist;
(g) disengaging the guide bars; and
(h) lowering the assembly onto a support platform for servicing.

The assembly of the present invention is suitable for any gear box, which when mounted and stationery is a substantially horizontal plane so that oil is retained by the collar.

The present invention also includes a gearbox comprising the assembly disclosed above, and a wind turbine comprising such a gearbox.

The invention claimed is:

1. An assembly for a horizontally mounted planetary gearbox, the assembly comprising:
high speed components of the gearbox;
in which the high speed component includes a bearing housing, the bearing housing including engagement means for one or more guide bars; and a housing for the high speed components; and
a collar located at the output end of the housing and extending radially inward from an outer surface of the housing;
wherein the collar retains lubricant in the gearbox when the gearbox is stationary, in which the housing comprises a cover, and in which the cover is reversibly connected to the collar, thereby facilitating access to the high speed components for maintenance.

2. The assembly according to claim 1, in which the collar includes a gap.

3. The assembly according to claim 2, in which one or more of the high speed components pass through the gap in the collar.

4. The assembly according to claim 3, in which the high speed component includes a high speed shaft.

5. The assembly according to claim 3, in which the high speed component includes a mechanical pump.

6. The assembly according to claim 1, in which the cover comprises one or more holes.

7. The assembly according to claim 6, in which one or more of the high speed components pass through the holes in the cover.

8. The assembly according to claim 7, in which the high speed component includes a high speed shaft.

9. The assembly according to claim 7, in which the high speed component includes a mechanical pump.

10. The assembly according to claim 7, in which the high speed component includes a high speed intermediate shaft.

11. The assembly according to claim 1, in which a diameter of the cover is less than a diameter of the housing.

12. An assembly for a horizontally mounted planetary gearbox, the assembly comprising:
high speed components of the gearbox;
in which the high speed component includes a bearing housing, the bearing housing including engagement means for one or more guide bars; and a housing for the high speed components; and a collar located at the output end of the housing and extending radially inward from an outer surface of the housing;

wherein the collar retains lubricant in the gearbox when the gearbox is stationary, in which the high speed component includes a high speed intermediate shaft assembly comprising a gear, the gear including one or more holes through which one or more guide bars can pass for engagement with the bearing housing, wherein the high speed intermediate shaft assembly can be moved along the guide bars and out of the housing.

13. The assembly according to claim 12, in which the high speed intermediate shaft assembly can be supported by an external hoist prior to disengagement of the guide bars.

14. A gearbox comprising the assembly according to claim 12.

15. A wind turbine comprising the gearbox according to claim 14.

16. A method for maintaining an assembly for a horizontally mounted planetary gearbox according to claim 12, the method comprising the steps of:
 (a) removing the high speed shaft assembly;
 (b) checking a level of lubricant within the gearbox and if the level of lubricant is above a height of the collar draining sufficient lubricant by means of a mechanical pump so that the level of lubricant is below a height of the collar;
 (c) removing the mechanical pump;
 (d) removing a rear cover;
 (e) engaging the guide bars with the bearing housing;
 (f) moving the high speed intermediate shaft assembly along the guide bars and out of the housing;
 (g) supporting the high speed intermediate shaft assembly by an external hoist;
 (h) disengaging the guide bars; and
 (i) lowering the assembly onto a support platform for servicing.

* * * * *